United States Patent [19]
Kim

[11] Patent Number: 5,850,546
[45] Date of Patent: Dec. 15, 1998

[54] CENTRAL PROCESSING UNIT RESET DEVICE AND A RESET METHOD FOR A CENTRAL PROCESSING UNIT

[75] Inventor: Ji-Sang Kim, Suwon-si, Rep. of Korea

[73] Assignee: SamSung Electronics Co., Ltd., Suwon, Rep. of Korea

[21] Appl. No.: 761,389

[22] Filed: Dec. 6, 1996

[30] Foreign Application Priority Data

Dec. 8, 1995 [KR] Rep. of Korea ............... 1995 47985

[51] Int. Cl.[6] ................................................. G06F 9/00
[52] U.S. Cl. ................................................. 395/651
[58] Field of Search ........................... 395/651, 652, 395/653, 828, 830, 835, 837, 838, 839, 887

[56] References Cited

U.S. PATENT DOCUMENTS

| | | |
|---|---|---|
| 5,157,270 | 10/1992 | Sakai . |
| 5,203,000 | 4/1993 | Folkes et al. . |
| 5,226,122 | 7/1993 | Thayer et al. ........................ 395/275 |
| 5,361,365 | 11/1994 | Hirano et al. ........................ 395/652 |
| 5,400,341 | 3/1995 | Makino et al. . |
| 5,410,706 | 4/1995 | Farrand et al. ...................... 395/652 |
| 5,430,865 | 7/1995 | Lazik . |
| 5,471,674 | 11/1995 | Stewart et al. ...................... 395/652 |
| 5,513,319 | 4/1996 | Finch et al. . |
| 5,564,010 | 10/1996 | Henry et al. . |
| 5,574,943 | 11/1996 | Daftari . |

FOREIGN PATENT DOCUMENTS 0 516159A2  2/1992  European Pat. Off. .

*Primary Examiner*—Kevin A. Kriess
*Attorney, Agent, or Firm*—Robert E. Bushnell, Esq.

[57] ABSTRACT

A central processing unit reset device for a portable computer system having no hardware reset switch. The central processing unit reset device includes a central processing unit having a reset terminal. A keyboard contains a plurality of discrete keys including a reset key that are independently operable by manual depression. The reset key serves as a reset switch for allowing a user to reboot an operating system of the central processing unit even when the central processing unit is locked in an infinite loop. A controller is electrically connected to the keyboard to scan the user's input through the keyboard and generate a reset request signal in response to the user's depression of said reset key on the keyboard. Finally, a reset driving circuit is electrically connected to the controller to generate a central processing unit reset signal to the reset terminal to reboot the operating system of the central processing unit.

18 Claims, 2 Drawing Sheets

CENTRAL PROCESSING UNIT RESET DEVICE AND A RESET METHOD FOR A CENTRAL PROCESSING UNIT

CLAIM FOR PRIORITY UNDER 35 U.S.C. §119

This application makes reference to, incorporates the same herein, and claims all benefits accruing under 35 U.S.C. §119 from an application for A Central Processing Unit Reset Device And The Reset Method earlier filed in the Korean Industrial Property Office on 8 Dec. 1995 and there duly assigned Ser. No. 47985/1995.

BACKGROUND OF THE INVENTION

1. Technical Field

The present invention relates to a central processing unit reset device, and more particularly relates to a central processing unit reset device and a reset method for resetting operation of a central processing unit using a common keyboard.

2. Background Art

Generally, computer systems having one or more central processing units may be reset either by software that monitors a keyboard or other input devices for a predetermined input, or by physically actuating a reset switch in response to a program error. The former is commonly known as a "soft reset" in which a central processing unit is reset in response to depression of a combination of "CTRL"- "ALT"- "DEL" keystrokes on a keyboard simultaneously, and the latter is commonly known as a "hard reset". Examples of conventional "soft reset" and "hard reset" techniques for resetting operation of a central processing unit (CPU) are disclosed in U.S. Pat. No. 5,410,706 for Computer System Having A Remote Reboot Facility Both Hard And Soft Reset Capabilities issued to Farrand et al., U.S. Pat. No. 5,430,865 for Hardware Remote Reset Circuit issued to Lazik, U.S. Pat. No. 5,513,319 for Watchdog Timer For Computer System Reset issued to Finch et al., and U.S. Pat. No. 5,574,943 for Gate-A20 and CPU Reset Circuit For Microprocessor-Based Computer System issued to Daftari.

Most personal computers (PC) available in the market today are designed to allow a user to reset the CPU by either "soft reset" in response to depression of"CTRL"- "ALT"- "DEL" keystrokes on a keyboard, or by "hard reset" in response to actuation of a dedicated hardware reset switch. The reset switch is adapted to trigger complex hardware reset circuitry within a computer chassis to generate a CPU reset signal for resetting operation of the CPU as disclosed, for example, in U.S. Pat. No. 5,157,270 for Reset Signal Generating Circuit issued to Sakai, and U.S. Pat. No. 5,564,010 for Reset Signal Generator For Generating Resets Of Multiple Duration issued to Henry et al. The requirement of a hardware reset switch is often necessary because the computer system may enter undesirable state from which it cannot fully recover by executing a "soft reset". For example, the CPU may "lock up", trapped in an endless loop or stalled, unable to execute instructions. Once the computer system has entered such a state, only a "hard reset" will return the computer system to its normal operating state. However, for many computer systems such as an ultra light "notebook" computer in which portability and compactness are desirable, a dedicated hardware reset switch is not optionally available for the user to reset operation of a CPU if the CPU is trapped in an endless or infinite loop. Consequently, the computer system having a power switch incorporated therein must first be turned off and then turned back on for operation. This requirement, as I have observed, is not only time consuming but is also burdensome.

SUMMARY OF THE INVENTION

Accordingly, it is therefore an object of the present invention to provide an improved central processing unit reset device for a computer system.

It is also an object to provide a central processing unit reset device in a computer system for allowing a user to reset operation of a central processing unit even when the central processing unit is locked in an infinite loop by way of a common keyboard.

It is further an object to provide a central processing unit reset device in a computer system having no manual reset switch for allowing the user to reset operation of a central processing unit by simply depressing an especially made reset switch key on a keyboard serving as a reset switch.

These and other objects of the present invention can be achieved by a central processing unit reset unit reset device includes a central processing unit having a reset terminal. A keyboard contains a plurality of discrete keys including a reset key that are independently operable by manual depression. The reset key serves as a reset switch for allowing a user to reset operation of the central processing unit even when the central processing unit is locked in an infinite loop. A controller is electrically connected to the keyboard, for scanning the user's input through the keyboard and for generating a reset request signal in response to the user's depression of said reset key on the keyboard. Finally, a reset driving circuit is electrically connected to the controller, for generating a central processing unit reset signal to the reset terminal to reset operation of the central processing unit.

A reset method for resetting operation of a central processing unit in a computer system includes the steps of checking whether a keyboard scanning is permitted by a controller; determining whether a reset key on a keyboard is depressed by a user when the keyboard scanning is permitted by the controller electrically connected to the keyboard integrated with the computer system for allowing the user to reset operation of the central processing unit; when the reset key on the keyboard is depressed by the user, producing a reset request signal to request generation of a central processing unit reset signal from a reset driving circuit electrically connected to the controller; and generating the central processing unit reset request signal to reset operation of the central processing unit upon reception of the reset request signal.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
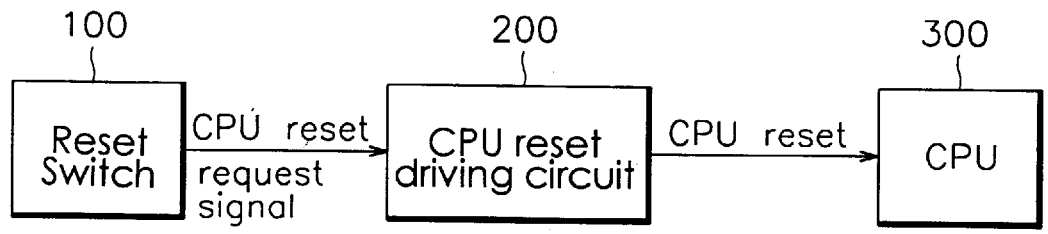
FIG. 1 is a schematic diagram of a conventional CPU reset device.

Referring now to the drawings and particularly to FIG. 1, which is a schematic diagram of a typical central processing unit (CPU) reset device in a computer system. As shown in FIG. 1, the typical CPU reset device includes a hardware reset switch 100 which is operated by the user to allow generation of a reset request signal, a CPU 300 which interrupts all operation upon reception of a CPU reset signal, and a CPU reset driving circuit 200 which receives the reset request signal from the hardware reset switch 100 and generates in response therefrom a CPU reset signal to reset operation of the CPU 300, that is, to reboot an operating system of the CPU 300. Upon reception of a CPU reset signal, the CPU 300 interrupts all operation and resumes operation in response to operation of the CPU reset driving circuit 200.

For many computer systems such as an ultra light "notebook" computer in which portability and compactness are desirable, however, such a dedicated hardware reset switch is not optionally available for the user to reset operation of a CPU in case when the CPU is trapped in an endless or infinite loop. Consequently, the computer system must first be turned off and then turned back on for operation. This requirement, as I have previously described, is not only time consuming but is also burdensome.

Figure 2:
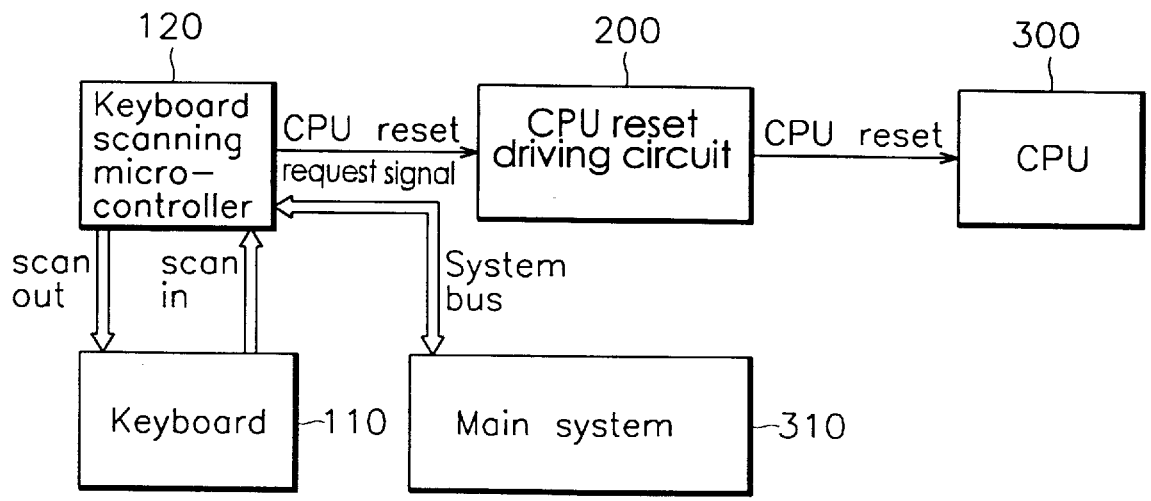
FIG. 2 is a schematic diagram of a CPU reset device constructed according to the principles of the present invention.

Turning now to FIG. 2 which illustrates a CPU reset device constructed according to the principles of the present invention. The CPU reset device includes a keyboard 110 having a plurality of discrete keys including a reset switch key which is operated by the user like as a reset switch. The reset switch key is provided by changing the system configuration and adding software to respond to the manual depression of the reset switch key. A keyboard scanning micro-controller 120 is electrically connected to the keyboard 110 to scan the depression of any discrete key of the keyboard. Keyboard scanning micro-controller 120 is designed to operate regardless of the operating condition of the computer system such as when the CPU is trapped in an infinite loop. The keyboard scanning micro-controller 120 includes an internal timer (not separately shown) for allowing the micro-controller 120 to scan and sense input of a reset key stroke from the keyboard 110 at each predetermined time interval set by the internal timer. When the reset switch stroke from the keyboard is sensed, the micro-controller 120 generates a CPU reset request signal even when the computer system is locked in an infinite loop. A main system 310 is connected to the keyboard scanning micro-controller 120 to respond to the depression of a reset switch key on the keyboard through a system bus so as to inform the keyboard scanning micro-controller 120 to generate a CPU reset request signal. A CPU reset driving circuit 200 is connected to the keyboard scanning micro-controller 120 to generate a CPU reset in response to reception of the CPU reset request signal from the keyboard scanning micro-controller 120. Finally, a CPU 300 is electrically connected to the CPU reset driving circuit 200 to interrupt all operation after receiving a CPU reset signal through a reset port.

Figure 3:
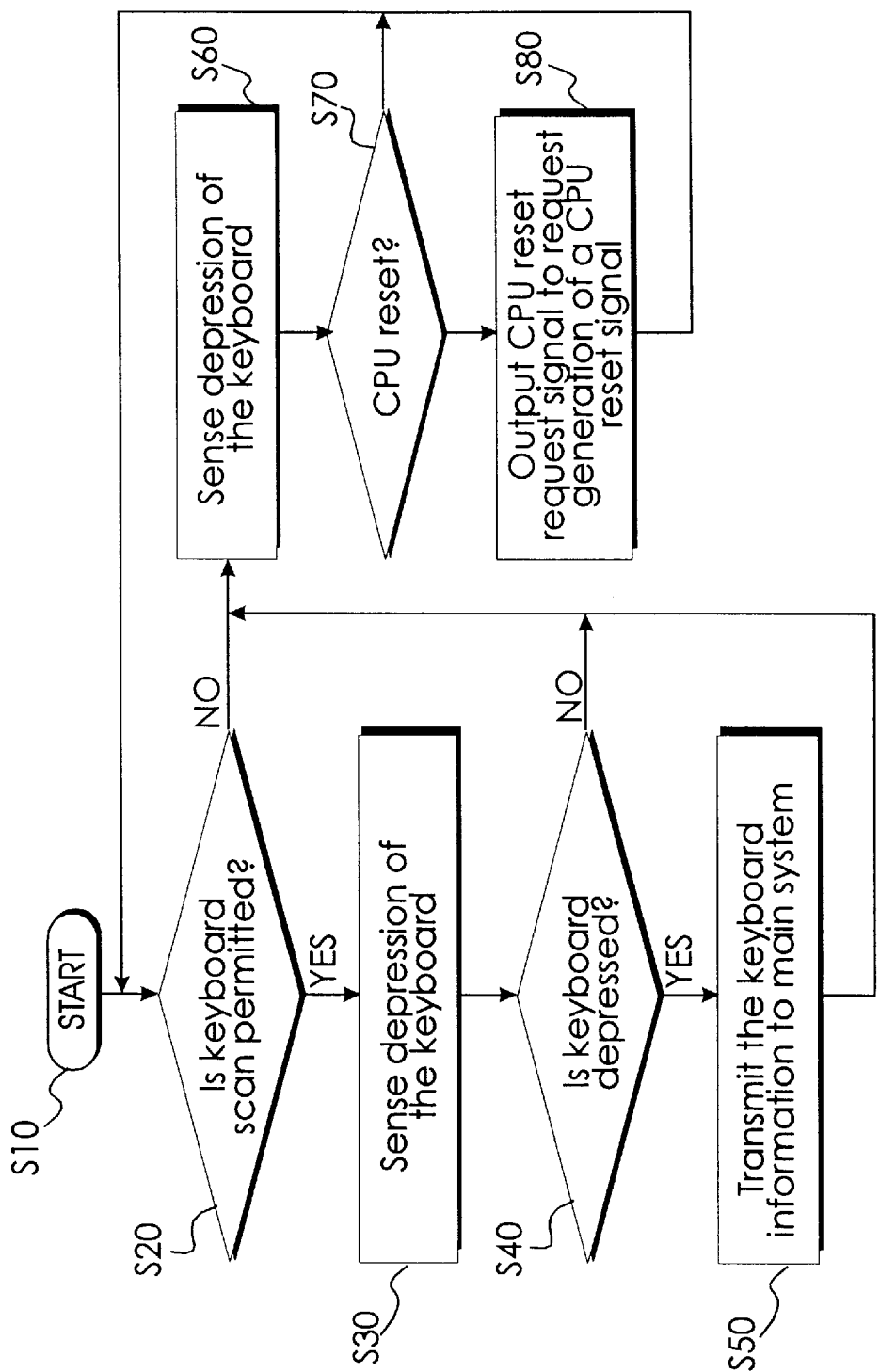
FIG. 3 is a flow chart illustrating a process of resetting operation of a CPU by the CPU reset device constructed according to the principles of the present invention.

Referring to FIG. 3 which illustrates a process of resetting operation of a CPU by the CPU reset device constructed according to the principles of the present invention. The reset process includes the steps of: checking whether a keyboard scanning is permitted; sensing depression of a keyboard; determining whether the keyboard is pressed; transmitting a key signal corresponding to the depression of the keyboard to a main system; determining whether the key signal represents a CPU reset request signal; and outputting a CPU reset request signal to request generation of a CPU reset signal when the key signal represents a CPU reset request signal.

The operation of the CPU reset device constructed according to the principles of the present invention is now described in detail as follows.

First, the keyboard scanning micro-controller 120 checks whether a keyboard scanning is permitted at step S20 and senses the depression of a keyboard when the keyboard scanning is permitted at step S30. When any key on the keyboard is depressed by the user, the keyboard micro-controller 120 generates a signal in order to check the keyboard information through the system bus, executes the scanning through a scan-in line and determines whether the keyboard is pressed at step S40. After the keyboard is pressed by the user at step S40, the keyboard micro-controller 120 transmits the keyboard information to the main system 310. Then, the keyboard micro-controller 120 senses the depression of the keyboard again at step S60.

Another scanning is executed through a scan-out or a scan-in when the keyboard scanning is not permitted at step S20, the micro-controller 120 senses the depression of the keyboard at step S60. The keyboard as contemplated by the present invention does not have compatibility because it is integrated in the portable computer system. Steps S30 and S40 are scanning steps for a keyboard scan code and step S60 is a scanning step for CPU reset. Therefore, the keyboard can execute a special function by a combination of key strokes on the keyboard except a keyboard function. If the keyboard is not pressed, the step S20 is executed again. And, if the keyboard is pressed, the CPU reset request signal is output from the keyboard scanning micro-controller 120 to the CPU reset driving circuit 200. The CPU reset signal is then output to the CPU after the micro-controller 120 requests the CPU reset driving circuit 200 to generate the CPU reset request signal.

As described above, the present invention provides the CPU reset device and a reset method for portable computer system having no hardware reset switch for allowing the user to efficiently reset operation of a CPU without delay and without the need to turn on and turn off a main power switch.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the appended claims.

What is claimed is:

1. A computer system, comprising:
   a central processing unit having a reset terminal;
   a keyboard having a plurality of discrete keys that are independently operable by manual depression including a reset key serving as a reset switch for allowing a user to reboot an operating system of the central processing unit;
   a controller electrically connected to the keyboard, for scanning the keyboard and for generating a reset request signal in response to the user's depression of said reset key on the keyboard; and
   a reset driving circuit electrically connected to the controller, for generating a central processing unit reset signal to the reset terminal to reboot the operating system of the central processing unit.

2. The computer system of claim 1, further comprising a main system electrically connected to said controller for enabling generation of said reset request signal, when the user depresses said reset key on the keyboard.

3. The computer system of claim 1, further comprised of said controller including an internal timer for initiating the scanning of the keyboard for the depression of said reset key periodically at each predetermined time period set by said internal timer even when the central processing unit is locked in an infinite loop.

4. The computer system of claim 1, further comprised of said reset key serving as said reset switch for allowing the user to reboot the operating system of the central processing unit even when the central processing unit is locked in an infinite loop.

5. The computer system of claim 4, further comprising a main system electrically connected to said controller for enabling generation of said reset request signal, when the user depresses said reset key on the keyboard.

6. The computer system of claim 5, further comprised of said controller including an internal timer for initiating the scanning of the keyboard for the depression of said reset key periodically at each predetermined time period set by said internal timer even when the central processing unit is locked in an infinite loop.

7. A portable computer system, comprising:
- a main computer body containing a central processing unit having a reset terminal and auxiliary devices;
- a display unit physically and electrically connected to said main computer body for providing a visual display of data information;
- a keyboard positioned on said main computer body and having a plurality of discrete keys including a reset key serving as a reset switch for allowing a user to reboot an operating system of the central processing unit;
- a controller electrically connected to the keyboard and included in said main computer body, for scanning the keyboard and for generating a reset request signal in response to the user's depression of said reset key on the keyboard; and
- a reset driving circuit electrically connected to the controller and included in said main computer body, for generating a central processing unit reset signal to the reset terminal to reboot the operating system of the central processing unit.

8. The portable computer system of claim 7, further comprising a main system electrically connected to said controller for enabling generation of said reset request signal, when the user depresses said reset key on the keyboard.

9. The portable computer system of claim 7, further comprised of said controller including an internal timer for initiating the scanning of the keyboard for the depression of said reset key periodically at each predetermined time period set by said internal timer even when the central processing unit is locked in an infinite loop.

10. The portable computer system of claim 7, further comprised of said reset key serving as said reset switch for allowing the user to reboot the operating system of the central processing unit even when the central processing is locked in an infinite loop.

11. The portable computer system of claim 10, further comprising a main system electrically connected to said controller for enabling generation of said reset request signal, when the user depresses said reset key on the keyboard.

12. The portable computer system of claim 11, further comprised of said controller including an internal timer for initiating the scanning of the keyboard for the depression of said reset key periodically at each predetermined time period set by said internal timer even when the central processing unit is locked in an infinite loop.

13. A reset method for resetting operation of a central processing unit in a computer system, said reset method comprising the steps:
- checking whether keyboard scanning is permitted by a controller to determine whether a keyboard containing a plurality of discrete keys that are independently operable by manual depression to provide to said central processing unit a plurality of unique input signals representing a plurality of different control functions and a plurality of alphanumeric symbols manually designated by a user;
- determining whether a reset key among said plurality of discrete keys on said keyboard is depressed by the user when said keyboard scanning is permitted by said controller electrically connected to said keyboard, said keyboard being integrated with said computer system for allowing the user to reboot an operating system of the central processing unit;
- when the reset key on the keyboard is depressed by the user, producing a reset request signal to request generation of a central processing unit reset signal from a reset driving circuit operationally connected to said controller;
- generating the central processing unit reset request signal; and
- rebooting the operating system of the central processing unit upon reception of the reset request signal.

14. The reset method of claim 13, further comprised of said reset key serving as a software reset switch for allowing the user to reboot the operating system of the central processing unit even when the central processing unit is locked in an infinite loop.

15. The reset method of claim 13, further comprised of producing said reset request signal to request generation of said central processing unit reset signal while the central processing unit is locked in an infinite loop.

16. A computer system, comprising:
- a central processing unit;
- a keyboard having a plurality of discrete keys including a reset key serving as a software reset switch for allowing a user to reboot an operating system of the central processing unit, when the central processing unit is locked in an infinite loop; and
- circuitry electrically connected to the keyboard, for scanning the keyboard and for generating a reset signal to the central processing unit to automatically reboot the operating system of the central processing unit in response to the user's depression of said reset key on the keyboard.

17. The computer system of claim 16, further comprised of said circuitry comprising a controller for generating a reset request signal when the user depresses said reset key on the keyboard, a driver for generating said reset signal to said central processing unit in response to said reset request signal, and a main system electrically connected to said controller for enabling generation of said reset request signal to said driver.

18. The computer system of claim 17, further comprised of said controller including an internal timer for initiating the scanning of the keyboard for the depression of said reset key periodically at each predetermined time period set by said internal timer even when the central processing unit is locked in said infinite loop.

* * * * *